Jan. 3, 1956 — D. C. LUDWIG — 2,729,463
AUTOMOBILE FENDER WITH WHEEL WELL VENTILATING MEANS
Filed Oct. 18, 1950
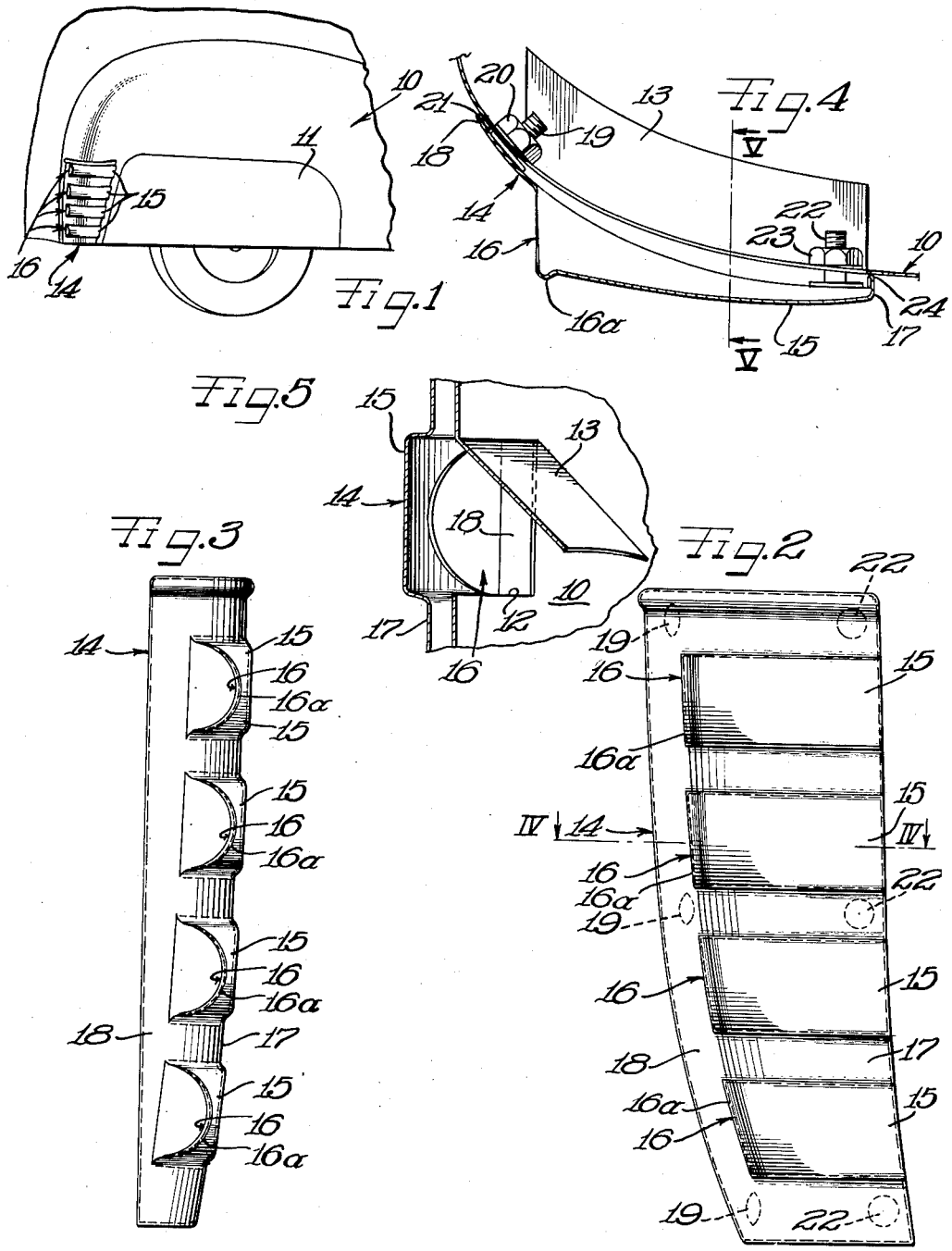
Inventor
Donald C. Ludwig United States Patent Office 2,729,463
Patented Jan. 3, 1956

2,729,463

AUTOMOBILE FENDER WITH WHEEL WELL VENTILATING MEANS

Donald C. Ludwig, Detroit, Mich., assignor to Houdaille-Hershey Corporation, Detroit, Mich., a corporation of Michigan Application October 18, 1950, Serial No. 190,812

14 Claims. (Cl. 280—152)

This invention relates in general to improvements in fenders and more particularly to means for ventilating the wheel wells enclosed by automobile fenders.

In the vehicle industry and particularly in the automobile branch thereof, the current trend is toward body constructions that are low in silhouette and low slung. The wheel wells of the automobile having the brake assembly and associated heat generating parts positioned therein are thus often substantially shut off by the fender and the automobile body from proper ventilation.

As the term "fender" shall herein after be employed, it refers to any form of wheel fender in its broad sense, whether such fender be separated from the vehicle body part, partly separated from the vehicle body part, or actually an integral part of the vehicle body and whether or not it projects outwardly from the principal body portion of the vehicle.

An important object of the present invention is to provide means on the fenders for ventilating the wheel well.

Another object of the present invention is to provide a ventilation device for vehicle fenders for effecting circulation of air through the associated wheel well.

Another object of the present invention is to provide a ventilator in the form of a stone guard for attachment to the front portions of a rear fender.

Other objects, features and advantages of the present invention will be readily apparent from the following detailed description of a preferred embodiment thereof taken in conjunction with the accompanying drawings, in which:

Figure 1 is a fragmentary side elevational view showing a fender embodying the present invention;

Figure 2 is an enlarged outer side elevational view of the ventilator stone guard shown in Figure 1;

Figure 3 is a front elevational view of the stone guard;

Figure 4 is an enlarged horizontal sectional view taken substantially on the line IV—IV of Figure 2; and Figure 5 is an enlarged sectional view taken substantially on the line V—V of Figure 4.

A rear fender 10 is herein provided for the type of automotive vehicle having a low slung body. The fender 10, having an access opening, carries removably attached thereto a fender skirt or shield 11 which protectively and ornamentally substantially closes the access opening.

Due to the low slung body, inadequate ventilation may result in the wheel well defined by the fender. The heat, which is generated by the brake assembly and associated parts located in the wheel well should be dissipated for satisfactory functioning of the mechanisms.

In accordance with the present invention, air intake means comprising a vertical series of apertures 12 are provided in the forward portion of the fender 10 to permit air to flow into the wheel well during movement of the vehicle. The fender 10 is cut to form the apertures 12, in a manner shown in Figure 5, and also formed thereby are inwardly bent reinforcing flanges or baffles 13 for providing an air passageway and directing the air flow inwardly and downwardly in the wheel well.

For drawing air into the apertures 12, a ventilator 14 is positioned over the apertured portion of the fender 10. Where the fender has a bulging or curved leading portion, the ventilator comprises a stone guard which may be formed as a plate of suitable material generally conforming to the contour of the supporting portion of the fender.

To enable air to pass through the stone guard 14, a vertical series of longitudinally disposed channel-shaped embossment sections or air ducts 15 are integrally pressed outwardly in the stone guard 14 with openings 16 at their forward ends. Each opening 16 has a semi-circular cross section and is positioned to direct air into an associated aperture 12. Reinforcement for the edges of the channels defining the openings 16 is provided by bead or rib flanges 16a.

The air ducts 15 are formed from a panel body 17 into curved longitudinal walls that flatten out as they extend toward the trailing edge of the panel 17 to blend in a decorative manner with the contour of the fender 10, thereby improving the appearance of the fender assembly.

For mounting the ventilator stone guard 14, the base or body portion 17, having the air ducts 15 extending therefrom, has a forward, curved marginal portion 18 with a plurality of suitably threaded stud bolts 19 welded to the inner side thereof and insertable through suitable slotted mounting holes in the fender 10. Nuts 20 on bolts 19 secure the forward margin of the stone guard 14 to the front portion of the fender 10. The curved front end portion 18 has a forward marginal underturned reinforcing flange 21, which abuts against the fender 10. This further affords a spaced relationship between the front portion of the ventilator base panel 17 and the underlying portion of the fender shield fender 10.

Similarly, the rear margin of the stone guard ventilator 14 has suitably threaded stud bolts 22 welded thereto at the base 17 which are insertable through suitable slotted mounting holes in the fender 10. Nuts 23 on the threaded bolts 22 secure the rear margin of the stone guard 14 to the fender 10. An inturned and return-bent reinforcing and spacer flange structure 24 formed on the rear margin of the base panel 17 abuts the fender 10 rearwardly of the apertures 12 to provide a spaced relationship between the fender 10 and the rear portion of the panel.

The spaced relationship of the panel body 17 from the fender maintained by the marginal flanges assures resilient, tensioned drawing up of the ventilator panel when mounted through the medium of the bolts 19 and 22. This avoids rattling and also assures close fit of the margins of the ventilator panel with the fender shield.

It will be understood that modifications and variations may be effected without departing from the scope of the novel concepts of the present invention.

I claim as my invention:

1. A stone guard adapted for use on vehicle fenders comprising, a body member, and a series of longitudinally disposed channel-shaped sections on said body, said sections having openings at the forward ends thereof to provide ventilation therethrough.

2. In combination, a vehicle fender having openings therein to provide air passageways, and a stone guard comprising a series of longitudinally disposed channel-shaped sections positioned in overlying relationship with said fender openings, said channel-shaped sections having air openings.

3. In a vehicle fender assembly for enclosing a wheel well, said fender having an apertured portion thereon, and a stone guard comprising a series of vertically spaced longitudinally disposed channel-shaped sections integrally formed therewith and having openings at the forward ends thereof for scooping air thereinto, said channel-shaped sections communicating with said apertured portion to direct air therethrough into the wheel well.

4. In combination, a vehicle rear fender having an apertured portion at the leading end thereof, and a stone guard having longitudinally disposed channel-shaped means disposed over said opening, said channel-shaped means being open at the forward end thereof to provide ventilation through said apertured portion.

5. In combination, a vehicle fender having an opening therein, a stone guard having a base mounted to said fender in overlying relationship to said opening, and marginal flanges on said base abutting against said fender to provide a spaced relationship between said fender and said stone guard, and air duct means on said base communicating with said opening to provide ventilation through said opening.

6. A vehicle stone guard comprising, a vertically elongated and transversely curved panel body, a series of vertically spaced transversely disposed channel-shaped sections integrally formed from said panel body, and means adjacent margins of said body to attach the same to a fender.

7. A vehicle stone guard comprising, a panel body having a curved forward margin, and a series of vertically spaced longitudinally disposed channel-shaped sections on said body having the forward ends thereof disposed at the rear of said forward margin.

8. A vehicle stone guard comprising, a resilient panel, opposite marginal formations on said panel for engaging against a fender and supporting the principal area of the panel in spaced relation to the fender, and attachment means carried by said panel inwardly from said marginal formations for drawing the panel under resilient tension toward the fender.

9. In combination in a fender assembly, the fender having a front wall curving bulgingly outwardly and then extending rearwardly, whereby to provide an arcuate generally forwardly and outwardly directed shoulder, said shoulder having an elongated horizontally extending ventilation opening therein extending from the forward portion of the shoulder into the rear portion of the shoulder, and air scoop means substantially concealing said opening and extending from beyond the rear end of said opening forwardly angularly to said shoulder and at its forward portion lying in substantially outwardly offset relation to the forward portion of the shoulder and defining a forwardly directed mouth scoopingly disposed for directing air inwardly through said opening into the fender.

10. In a vehicle fender defining the outer side of a wheel well, a generally vertically extending fender wall, said wall having an elongated opening in one end portion thereof above the bottom of the fender and below the top of the fender and extending in a generally front to rear direction, and means at said opening for promoting circulation of air in generally front to rear direction through said opening.

11. In a vehicle fender defining the outer side of a wheel well, a generally vertically extending fender wall, said wall having an elongated opening in one end portion thereof above the bottom of the fender and below the top of the fender and extending in a generally front to rear direction, and means at said opening for promoting circulation of air in generally front to rear direction through said opening, said means including a portion for deflecting the air transversely to said opening at the inside of the fender.

12. In a vehicle fender defining the outer side of a wheel well, a fender wall depending generally vertically and having in one end portion thereof a plurality of vertically spaced air openings elongated in a front to rear direction, and means at said openings for promoting air circulation therethrough.

13. In a vehicle fender assembly, a fender having a ventilation opening extending through a generally vertical laterally facing side wall to a point adjacent to but substantially beyond an end portion of the fender, and a member mounted on the outer side of the fender providing an elongated air duct communicating with said opening.

14. In a vehicle fender defining the outer side of a wheel well, a generally vertically extending fender wall, said fender wall having at the forward portion thereof means defining a plurality of vertically spaced openings with flange means between said openings and extending inwardly therefrom for controlling the movement of air within the wheel well as it enters said openings in the forward movement of the fender in service on an associated vehicle.

References Cited in the file of this patent

UNITED STATES PATENTS

| | | |
|---|---|---|
| 778,455 | Lewis | Dec. 27, 1904 |
| 1,525,429 | Hunter | Feb. 3, 1925 |
| 2,038,265 | Bradley | Apr. 21, 1936 |
| 2,127,409 | Klavik | Aug. 16, 1938 |
| 2,202,903 | Fergueson | June 4, 1940 |
| 2,218,626 | Snyder | Oct. 22, 1940 |
| 2,562,103 | Kline | July 24, 1951 |

FOREIGN PATENTS

| | | |
|---|---|---|
| 890,806 | France | Nov. 19, 1943 |
| 980,180 | France | Dec. 20, 1950 |